United States Patent
Sandstrom

(10) Patent No.: US 7,594,528 B2
(45) Date of Patent: Sep. 29, 2009

(54) TIRE WITH SIDEWALL COMPRISED OF EMULSION STYRENE/BUTADIENE RUBBER, CIS 1,4-POLYISOPRENE RUBBER AND CIS 1,4-POLYBUTADIENE RUBBER

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/715,694

(22) Filed: Mar. 8, 2007

(65) Prior Publication Data

US 2008/0216935 A1 Sep. 11, 2008

(51) Int. Cl.
*B60C 1/00* (2006.01)
(52) U.S. Cl. ..................................... 152/525
(58) Field of Classification Search ................... 152/525
See application file for complete search history.

(56) References Cited

U.S. PATENT DOCUMENTS

| | | | |
|---|---|---|---|
| 5,504,140 A | 4/1996 | Zanzig et al. | 524/526 |
| 5,534,574 A | 7/1996 | Sandstrom et al. | 524/262 |
| 5,843,249 A | 12/1998 | Ryba et al. | 152/209 R |
| 6,872,772 B2 * | 3/2005 | Steiner et al. | 524/526 |
| 2002/0061955 A1 | 5/2002 | Colvin et al. | 524/493 |
| 2006/0266454 A1 * | 11/2006 | Sandstrom et al. | 152/209.1 |

FOREIGN PATENT DOCUMENTS

| | | |
|---|---|---|
| EP | 405904 | 1/1991 |
| EP | 942042 | 9/1999 |
| EP | 1452344 | 9/2004 |
| JP | 360226537 A | 11/1985 |
| JP | 363033436 A | 2/1988 |

\* cited by examiner

*Primary Examiner*—Robert D. Harlan
(74) *Attorney, Agent, or Firm*—Henry C. Young, Jr.

(57) ABSTRACT

This invention relates to a tire with a sidewall composition comprised of cis 1,4-polyisoprene rubber, particularly natural cis 1,4-polyisoprene rubber, and high cis 1,4-polybutadiene rubber combined with a partial replacement of the cis 1,4-polyisoprene rubber, particularly natural rubber, with a specialized emulsion polymerization styrene/butadiene rubber (E-SBR) having a glass transition temperature (Tg), similar to the Tg of natural cis 1,4-polyisoprene rubber, from about −70 to about −60° C. and a limited bound styrene content in a range of from about 12 to about 16 percent.

2 Claims, No Drawings ents such as, for example, carbon black, oil, stearic acid, zinc oxide, silica, wax, antidegradants, resin(s), sulfur and accelerator(s) and silica and silica coupler where appropriate. The terms "rubber" and "elastomer" may be used interchangeably. The amounts of materials are usually expressed in parts of material per 100 parts of rubber polymer by weight (phr).

TIRE WITH SIDEWALL COMPRISED OF EMULSION STYRENE/BUTADIENE RUBBER, CIS 1,4-POLYISOPRENE RUBBER AND CIS 1,4-POLYBUTADIENE RUBBER

FIELD OF THE INVENTION

This invention relates to a tire with a sidewall composition comprised of cis 1,4-polyisoprene rubber, particularly natural cis 1,4-polyisoprene rubber, and high cis 1,4-polybutadiene rubber combined with a partial replacement of the cis 1,4-polyisoprene rubber, particularly natural rubber, with a specialized emulsion polymerization styrene/butadiene rubber (E-SBR) having a glass transition temperature (Tg), similar to the Tg of natural cis 1,4-polyisoprene rubber, from about −70 to about −60° C. and a limited bound styrene content in a range of from about 12 to about 16 percent.

BACKGROUND OF THE INVENTION

A challenge is presented of replacing a portion of cis 1,4-polyisoprene rubber, particularly natural cis 1,4-polyisoprene rubber, with a synthetic polymer (other than synthetic cis 1,4-polyisoprene rubber) in a tire sidewall composition which is normally comprised of cis 1,4-polyisoprene rubber (particularly natural rubber) and cis 1,4-polybutadiene rubber to achieve a rubber composition of similar physical properties. A motivation for such challenge is a desire for a cis 1,4-polyisoprene rubber partial alternative, particularly a natural rubber partial alternative, in a form of a synthetic rubber (other than synthetic cis 1,4-polyisoprene rubber) to offset relative availability and/or cost considerations of cis 1,4-polyisoprene rubber, particularly natural rubber.

References made herein to synthetic rubber means synthetic rubber other than synthetic cis 1,4-polyisoprene rubber, unless otherwise indicated.

Therefore, such challenge has been undertaken to evaluate the feasibility of replacing a portion of cis 1,4-polyisoprene rubber, particularly natural rubber, in a tire sidewall with a synthetic rubber (other than a synthetic cis 1,4-polyisoprene rubber).

A simple substitution of a synthetic elastomer into a tire sidewall rubber composition which contains a significant cis 1,4-polyisoprene rubber, particularly natural rubber, content is not considered herein to be a feasible alternative where it is desired to achieve a rubber composition with similar physical properties.

It is to be appreciated that cis 1,4-polyisoprene rubber may be in a form of natural rubber and of synthetic cis 1,4-polyisoprene rubber (synthetic natural rubber). It is to be further appreciated that such natural rubber may be derived from, for example, trees and plants such as, for example, guayule plants and that such synthetic rubber may be derived from, for example, various chemical processes, whether by industrial, laboratory or other process.

While this presentation is primarily focused on replacement of a portion of natural cis 1,4-polyisoprene rubber in a rubber composition, it is intended herein that at least a portion of such natural rubber may be a synthetic cis 1,4-polyisoprene rubber.

In practice, pneumatic rubber tires conventionally have relatively thin rubber sidewalls which are normally expected to be able to be subject to significant punishment under typically operating conditions by undergoing considerable dynamic distortion and flexing, abrasion due to scuffing, fatigue cracking and weathering such as, for example, atmospheric ozone aging.

Significant physical properties for natural rubber/high cis 1,4-polybudadiene rubber based tire sidewall rubber compositions are considered herein to be rebound (at 100° C.) and tan delta (at 100° C.) which contribute to rolling resistance of the tire and therefore fuel economy of the associated vehicle, with higher values being desired for the Rebound property and lower values being desired for the tan delta property.

Additional desirable physical properties are considered herein to be higher low strain stiffness properties, in combination with the above rebound and tan delta properties, as indicated by Shore A hardness values and dynamic modulus G' at 10 percent strain values at 100° C. to promote handling for the tire and resistance to sidewall wear.

Accordingly, it is readily seen that a partial substitution of a synthetic rubber for a portion of the natural rubber in such tire sidewall rubber composition is not a simple matter, and requires more than routine experimentation, where it is desired to substantially retain, or improve upon, a suitable balance of the representative physical properties of a natural rubber/high cis 1,4-polybutadiene sidewall rubber composition itself.

The aqueous emulsion polymerization prepared specialized styrene/butadiene rubber (E-SBR) for use in this invention for partial replacement of the natural rubber in the tire sidewall rubber composition contains bound styrene in a range of from about 12 to about 16 percent, and a Tg in a range of from about −60° C. to about −70° C. The specialized E-SBR has a Mooney (ML1+4), 100° C., viscosity in a range of from about 60 to about 100. A preferable specialized E-SBR has a bound styrene in a range of about 13 to about 15 percent in combination with a Mooney (ML1+4), 100° C., viscosity in a range from about 70 to about 90.

In the practice of this invention, the specialized E-SBR rubber has been observed to enable a partial replacement of the cis 1,4-polyisoprene rubber, particularly natural rubber, in a natural rubber-high cis 1,4-polybutadiene based tire sidewall compositions.

For this invention, a reference to glass transition temperature, or Tg, of an elastomer or sulfur vulcanizable polymer, particularly the specialized E-SBR polymer, represents an onset glass transition temperature of the respective elastomer or sulfur vulcanizable polymer in its uncured state. The Tg can be suitably determined by a differential scanning calorimeter (DSC) at a temperature rate of increase of 10° C. per minute, (ASTM 3418), a procedure well known to those having skill in such art.

A reference to Mooney (ML 1+4) viscosity of an elastomer or sulfur vulcanizable polymer, particularly the specialized E-SBR for use in this invention, represents the viscosity of the respective elastomer or sulfur vulcanizable polymer in its uncured state. The Mooney (ML 1+4) viscosity at 100° C. relates to its "Mooney Large" viscosity, taken at 100° C. using a one minute warm up time and a four minute period of viscosity measurement, a procedural method well known to those having skill in such art.

In the description of this invention, the terms "compounded" rubber compositions and "compounds"; where used refer to the respective rubber compositions which have been compounded with appropriate compounding ingredients such as, for example, carbon black, oil, stearic acid, zinc oxide, silica, wax, antidegradants, resin(s), sulfur and accelerator(s) and silica and silica coupler where appropriate. The terms "rubber" and "elastomer" may be used interchangeably. The amounts of materials are usually expressed in parts of material per 100 parts of rubber polymer by weight (phr).

Disclosure and Practice of the Invention

In accordance with this invention, a tire having a rubber sidewall is provided wherein said sidewall rubber composition is comprised of, based upon parts by weight per 100 parts by weight rubber (phr):

(A) about 10 to about 40, alternately about 15 to about 35 phr of natural cis 1,4-polyisoprene rubber (NR) having a Tg in a range of from about −60° C. to about −70° C., and (B) about 5 to about 35 phr, alternately from about 5 to about 30, phr of a specialized emulsion polymerization prepared styrene/butadiene rubber (specialized E-SBR) having a Tg in a range of from about −60° C. to about −70° C. (similar to the Tg of NR) selected from:

(1) an E-SBR having a bound styrene content in a range of from about 12 to about 16 percent combined with a Mooney (ML1+4), 100° C., viscosity in a range of from about 60 to about 100, or, (more preferably), (2) an E-SBR having a bound styrene content in a range of from about 13 to about 15 percent combined with a Mooney (ML1+4), 100° C., viscosity in a range of from about 70 to about 90;

(C) (optionally) from zero to about 20, alternately about 5 to about 15, phr of synthetic cis 1,4-polyisoprene rubber;

(D) from about 50 to about 70 phr cis 1,4-polybutadiene rubber; and (E) from about 30 to about 80, alternately from about 35 to about 70, phr of particulate reinforcing fillers comprised of:

(1) about 30 to about 80, alternately from about 35 to about 70, phr of rubber reinforcing carbon black, and, optionally;

(2) from zero to about 30, alternately from about 5 to about 20, phr of amorphous synthetic silica, preferably precipitated silica.

The silica (e.g. precipitated silica), if used, may optionally, and if desired, be used in conjunction with a silica coupler to couple the silica to the elastomer(s), to thus enhance its effect as reinforcement for the elastomer composition. Use of silica couplers for such purpose are well known and typically have a moiety reactive with hydroxyl groups (e.g. silanol groups) on the silica and another moiety interactive with the elastomer (s) to create the silica-to-rubber coupling effect.

The E-SBR (specialized styrene/butadiene copolymer) may be prepared, for example, using conventional aqueous emulsion copolymerization of styrene and 1,3-butadiene monomers in an aqueous medium in the presence of an iron/ hydroperoxide redox catalyst system (e.g. iron and hydroperoxide based) with a controlled styrene/butadiene monomer charge to achieve the desired bound styrene content of 12 to 16, or more preferably from 13 to 15 percent, in combination with the aforesaid Tg, (e.g. so long as the resulting styrene/ butadiene copolymer rubber is said specialized E-SBR), which would not require undue experimentation by one having skill in such art.

As hereinbefore mentioned, a coupling agent may, if desired, be utilized with the silica to aid in its reinforcement of the rubber composition which contains the silica. Such coupling agent conventionally contains a moiety reactive with hydroxyl groups on the silica (e.g. precipitated silica) and another and different moiety interactive with the diene hydrocarbon based elastomer.

In practice, said coupling agent for said optional silica reinforcement, if used, may be, for example, (A) a bis-(3-triakloxysilylalkyl) polysulfide such as, for example, a bis-(3-triethoxysilylpropyl) polysulfide, having an average of from 2 to about 4 and more preferably an average of from 2 to about 2.6 or from about 3.4 to about 4, connecting sulfur atoms in its polysulfidic bridge, or (B) a bis-(3-triethoxysilylpropyl) polysulfide having an average of from about 2 to about 2.6 connecting sulfur atoms in its polysulfidic bridge or a bis-(3-triethoxysilylpropyl) polysulfide having an average of from about 3.4 to about 4 connecting sulfur atoms in its polysulfidic bridge, wherein said polysulfide having an average of from 2 to about 2.6 connecting sulfur atoms in its polysulfidic bridge (to the exclusion of such polysulfide having an average of from 3 to 4 connecting sulfur atoms in its polysulfidic bridge) is blended with said rubber composition in the absence of sulfur and sulfur vulcanization accelerator and wherein said polysulfide having an average of from about 3.4 to about 4 connecting sulfur atoms in its polysulfidic bridge is thereafter blended with said rubber composition in the presence of sulfur and at least one sulfur vulcanization accelerator, or (C) an organoalkoxymercaptosilane composition of the general Formula (I) represented as:

$$(X)_n(R_7O)_{3-n}\text{—Si—}R_8\text{—SH} \qquad (I)$$

wherein X is a radical selected from a halogen, namely chlorine or bromine and preferably a chlorine radical, and from alkyl radicals having from one to 16, preferably from one through 4, carbon atoms, preferably selected from methyl, ethyl, propyl (e.g. n-propyl) and butyl (e.g. n-butyl) radicals; wherein $R_7$ is an alkyl radical having from 1 through 18, alternately 1 through 4, carbon atoms preferably selected from methyl and ethyl radicals and more preferably an ethyl radical; wherein $R_8$ is an alkylene radical having from one to 16, preferably from one through 4, carbon atoms, preferably a propylene radical; and n is an average value of from zero through 3, preferably zero, and wherein, in such cases where n is zero or 1, $R_7$ may be the same or different for each $(R_7O)$ moiety in the composition, and (D) said organalkoxyomercaptosilane of the general Formula (I) capped with a moiety which uncaps the organoalkoxymercaptosilane upon heating to an elevated temperature.

Representative examples of various organoalkoxymercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

Such organoalkoxymercaptosilanes may be capped with various moieties as discussed above.

A representative example of a capped organoalkoxymercaptosilane coupling agent useful for this invention is a liquid 3-octanoylthio-1-propyltriethoxysilane as NXT™ Silane from the GE Silicones Company.

The coupling agent may, for example, be added directly to the elastomer mixture or may be added as a composite of precipitated silica and such coupling agent formed by treating a precipitated silica therewith or by treating a colloidal silica therewith and precipitating the resulting composite.

For example, said optional silica (e.g. precipitated silica), or at least a portion of said optional silica, may be pre-treated prior to addition to said elastomer(s):

(A) with an alkylsilane of the general Formula (II), or (B) with said bis(3-triethoxysilylpropyl) polysulfide having an average of from about 2 to about 4 connecting sulfur atoms in its polysulfidic bridge, or (C) with said organomercaptosilane of the general Formula (I), or (D) with a combination of said alkylsilane of general Formula (I) and said bis(3-triethoxysilylpropyl) polysulfide having an average of from about 2 to about 4 connecting sulfur atoms in its polysulfidic bridge, or (E) with a combination of said alkylsilane of general Formula (II) and said organomercaptosilane of general Formula (I);

wherein said alkylsilane of the general Formula (J) is represented as:

$$X_n\text{—Si—}R_{6(4-n)} \quad (II)$$

wherein $R_6$ is an alkyl radical having from 1 to 18 carbon atoms, preferably from 1 through 4 carbon atoms; n is a value of from 1 through 3; X is a radical selected from the group consisting of halogens, preferably chlorine, and alkoxy groups selected from methoxy and ethoxy groups, preferably an ethoxy group.

A significant consideration for said pre-treatment of said silica is to reduce, or eliminate, evolution of alcohol in situ within the rubber composition during the mixing of the silica with said elastomer such as may be caused, for example, by reaction such coupling agent contained within the elastomer composition with hydroxyl groups (e.g. silanol groups) contained on the surface of the silica.

Representative of additional synthetic diene based elastomers for said tire sidewall rubber composition are, for example, synthetic cis 1,4-polyisoprene rubber and styrene/butadiene copolymer rubber.

It is readily understood by those having skill in the art that the rubber compositions would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, the aforesaid optional silica, and plasticizers, fillers, pigments, fatty acid, zinc oxide, microcrystalline waxes, antioxidants and antiozonants, peptizing agents and carbon black reinforcing filler. As known to those skilled in the art, depending on the intended use of the sulfur vulcanizable and sulfur-vulcanized material (rubbers), the additives mentioned above are selected and commonly used in conventional amounts.

The vulcanization is conducted in the presence of a sulfur-vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur.

Accelerators are used to control the time and/or temperature required for vulcanization and to improve the properties of the vulcanizate. In one embodiment, a single accelerator system may be used, i.e., primary accelerator. In another embodiment, combinations of two or more accelerators in which the primary accelerator is generally used in the larger amount, and a secondary accelerator which is generally used in smaller amounts in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The tire can be built, shaped, molded and cured by various methods which will be readily apparent to those having skill in such art.

The invention may be better understood by reference to the following example in which the parts and percentages are by weight unless otherwise indicated.

EXAMPLE I

Experiments were conducted to evaluate the feasibility of replacing a portion of cis 1,4-polyisoprene natural rubber in a rubber composition comprised of natural rubber and cis 1,4-polybutadiene rubber with an aqueous polymerization prepared specialized styrene/butadiene copolymer elastomer (E-SBR) having a bound styrene content of about 14 percent, Mooney (ML1+4), 100° C., viscosity of about 80 and a Tg (onset glass transition temperature) of about −65° C.

The E-SBR was a product of aqueous emulsion polymerization of 1,3-butadiene in a manner earlier described (e.g. via an iron/hydroperoxide redox catalyst system).

Rubber composition Samples A through H were prepared, with Sample A being a Control Sample without an inclusion of the E-SBR (specialized styrene/butadiene copolymer elastomer).

The rubber composition samples were prepared by mixing the elastomers together with reinforcing fillers and other rubber compounding ingredients in a first non-productive mixing stage (NP) an internal rubber mixer for about 4 minutes to a temperature of about 160° C. The resulting mixture is then mixed in a productive mixing stage (P) in an internal rubber mixer with curatives for about 2 minutes to a temperature of about 115° C. The rubber composition is cooled to below 40° C. between the non-productive mixing step and the productive mixing step.

The basic formulation for the rubber samples is presented in the following Table 1 expressed in parts by weight per 100 parts of rubber unless otherwise indicated.

TABLE 1

|  | Parts (phr) |
| --- | --- |
| First Non-Productive Mixing Step - Mixed to 160° C.) |  |
| Natural cis 1,4-polyisoprene rubber | 0-40 |
| Cis 1,4-polybutadiene rubber[1] | 60 |
| Specialized E-SBR elastomer[2] | 0-40 |
| Carbon black[3] | 51 |
| Oil, wax, processing aids | 18 |
| Fatty acid[4] | 1 |
| Antioxidant and antiozonant[5] | 5 |
| Zinc oxide | 3 |
| Productive Mixing Step - (Mixed to 115° C.) |  |
| Sulfur and accelerator(s)[6] | 2.5 |

[1]Obtained as BUD1207 ™ from the Goodyear Tire & Rubber Company
[2]Specialized emulsion polymerization prepared styrene/butadiene elastomer, E-SBR, containing about 14 percent bound styrene, an onset Tg of about −65° C. (similar to the Tg of the NR), and a Mooney (ML1 + 4), 100° C., viscosity of about 80, from The Goodyear Tire & Rubber Company
[3]N550, a rubber reinforcing carbon black ASTM designation
[4]Blend comprised of stearic, palmitic and oleic acids, primarily stearic acid (e.g. at least 90 weight percent stearic acid).
[5]Amine and quinoline types
[6]Curatives as sulfur and sulfenamide type sulfur vulcanization accelerator The following Table 2 illustrates cure behavior and various physical properties of natural rubber-rich rubber compositions based upon the basic recipe of Table 1 and reported herein as rubber Samples A through H.

As previously indicated, Sample A is a Control rubber Sample without the (specialized) E-SBR.

Where cured rubber samples are examined, such as for the Stress-Strain, Rebound, Hardness and Tear Strength measurements, the rubber samples were cured for about 12 minutes at a temperature of about 170° C.

For the Static and Dynamic Ozone Tests:

(A) Crack density relates to the number of observed cracks on the surface of a respective Sample where a value of zero means no observed cracks and a value of 1 means a few observed cracks (less than three observed cracks) with progressively higher numbered values representing a progressively larger number of cracks.

(B) Crack severity relates to the average length of the observed cracks in the surface of a respective Sample where a value of zero means no observed cracks and a value of 1

TABLE 2

| | Samples | | | | | | | |
|---|---|---|---|---|---|---|---|---|
| | Control | | | | | | | |
| | A | B | C | D | E | G | H | I |
| Cis 1,4-Polybutadiene (phr) | 60 | 60 | 60 | 60 | 60 | 60 | 60 | 60 |
| Natural rubber (phr) | 40 | 35 | 30 | 25 | 20 | 15 | 10 | 0 |
| Specialized E-SBR, 14% styrene (phr) | 0 | 5 | 10 | 15 | 20 | 25 | 30 | 40 |
| Surface tack of uncured rubber Sample (building tack), at 23° C., Newtons[1] | | | | | | | | |
| Original tack | 6.9 | N/A | 6.4 | N/A | 5.5 | N/A | N/A | 0.5 |
| Aged tack (air, 5 days, 23° C.) | 10 | N/A | 8.5 | N/A | 6.5 | N/A | N/A | 0.9 |
| RPA Strain sweep, 100° C.[2] | | | | | | | | |
| Modulus G', uncured, (KPa), 0.83 Hz 15% strain | 167 | 169 | 171 | 174 | 175 | 177 | 181 | 187 |
| Modulus G', 10 Hz, 10% strain (kPa) | 835 | 845 | 889 | 905 | 909 | 905 | 929 | 882 |
| Tan delta at 10% strain | 0.106 | 0.109 | 0.106 | 0.112 | 0.114 | 0.114 | 0.117 | 0.131 |
| Stress-strain, ATS[2] | | | | | | | | |
| Tensile strength (MPa) | 13.7 | 13.1 | 12.5 | 13.1 | 11.9 | 11.6 | 11.3 | 10.4 |
| Elongation at break (%) | 655 | 627 | 617 | 624 | 599 | 588 | 571 | 567 |
| 300% modulus (MPa) | 4.5 | 4.7 | 4.8 | 5 | 5 | 5.1 | 5.2 | 4.8 |
| Shore A hardness, 100° C. | 46 | 48 | 48 | 50 | 50 | 51 | 51 | 50 |
| Rebound, 100° C. | 59 | 59 | 59 | 59 | 58 | 58 | 57 | 55 |
| Tear Strength 95° C., (Newtons)[3] | 123 | 123 | 137 | 145 | 139 | 153 | 150 | 143 |
| Crack growth resistance (millimeters, mm, of crack growth in 1 hour)[4] | 21.1 | 22.7 | 22.9 | 22 | 23.6 | 25.4(B) | 23.1 | 21 |
| Static ozone resistance[5] | | | | | | | | |
| Crack density (No. of cracks) | 0 | 0 | 0 | 0 | 0 | 0 | 0 | 0 |
| Crack severity | 0 | 0 | 0 | 0 | 0 | 0 | 0 | 0 |
| Rank | 1 | 1 | 1 | 1 | 1 | 1 | 1 | 1 |
| Dynamic (cyclic) ozone resistance[6] | | | | | | | | |
| Crack density (No. of cracks) | 5 | 3 | 3 | 3 | 2 | 2 | 2 | 2 |
| Crack severity | 5 | 3 | 3 | 3 | 2 | 2 | 2 | 2 |
| Rank | 3 | 2 | 2 | 2 | 1 | 1 | 1 | 1 |
| Days | 21 | 21 | 21 | 21 | 21 | 21 | 21 | 21 |

[1]Data according to peel testing of uncured rubber Samples for an observed surface tack (building tack) for original un-aged and aged rubber Samples.
[2]Data according to Rubber Process Analyzer as RPA 2000 ™ instrument by Alpha Technologies, formerly the Flexsys Company and formerly the Monsanto Company
[3]Data according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[4]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force. The area of contact at the interface between the rubber samples is facilitated by placement of a Mylar ™ film between the samples with a cut-out window in the film to enable the two rubber samples to contact each other following which the samples are vulcanized together and the resultant composite of the two rubber compositions used for the peel strength test.
[5]Crack growth resistance measured by a Pierced Groove Flex test conducted at 93° C. at 360 cycles/min using a conical piercing needle 1/32" in diameter using a 6" × 1.5" × 0.25" sample using 180° flex wherein the flex region is a 1/4" diameter molded groove against the grain of the sample. The results are reported in terms of millimeters of crack growth after one hour.
[6]Static ozone test conditions: 48 hrs; 40° C.; variable strain; 50 ppbm ozone (50 parts per 100 million ozone concentration).
[7]Dynamic (cyclic) ozone test conditions: maximum of 21 days or until sample breaks; 38° C.; 25% strain; 50 ppbm ozone.

means short observed cracks and progressively higher numbered values mean observed cracks with progressively longer average lengths.

(C) Rank relates to a visual ranking of a respective individual Sample in the respective Table of Samples in terms of a combination of observed crack density and crack severity and whether the Sample breaks during the 21 day test where a value of 1 relates to the Sample with best visual appearance in terms of crack density and crack severity and samples with progressively higher values relate to Samples with a progressively worse visual appearance in terms of a combination of crack density and crack severity.

As hereinbefore pointed out, significant physical properties for the cis 1,4-polyisoprene natural rubber/trans 1,4-polybutadiene based rubber composition for a tire sidewall application are Rebound at 100° C. and tan delta at 100° C. which relate to vehicular fuel economy for a tire sidewall with higher values being desired for the Rebound property at 100° C. and lower values being desired for the tan delta property at 100° C.

Higher values of low strain stiffness properties as indicated by the Shore A hardness values and dynamic modulus G' at 10 percent strain values are desired to promote tire handling and resistance to tire sidewall wear.

Higher tear strength values are normally desired to promote resistance to tire sidewall damage during use of the tire.

Crack growth resistance is important to prevent or retard progressive growth of nicks or cuts that occur in the tire sidewall surface during use of the tire.

Good ozone exposure weathering resistance as measured by an ozone test is important to retard degradation of the sidewall rubber composition in the presence of atmospheric ozone.

From Table 2, for surface tack, it can be seen that the replacement of 10 or 20 phr of the natural rubber with the (specialized) E-SBR, namely rubber Samples B and D, gave surface tack similar to Control Rubber Sample A. However, the total replacement of natural rubber with 40 phr of the E-SBR, namely rubber Sample I, gave very poor surface tack which is not considered adequate for the laminate building process of a tire prior to curing.

For crack growth resistance, it can be seen that the replacement of the natural rubber with 5 to 40 phr of the (specialized) E-SBR, as observed for rubber Samples B through I, had minimal effect on the crack growth resistance of the respective Rubber Samples.

For tear strength, it can be seen that the tear strength is improved by the replacement of from 10 to 40 phr of natural rubber with the E-SBR, indicated by Samples C through I, which will help promote resistance to tire sidewall damage during tire use.

For static ozone resistance, it can be seen that the static ozone resistance remains similar to the Control Sample with replacement of 5 to 40 phr of the natural rubber with the E-SBR. However, for dynamic ozone resistance, it can be seen that the dynamic ozone resistance exhibited improvement with progressive addition of (replacement of natural rubber with) 5 to 40 phr of the E-SBR, as indicated by Samples B through I, as compared to the Control Sample A.

For hysteresis, it can be seen that for replacement of from 5 to 30 phr of the natural rubber with the E-SBR level, hysteresis of rubber Samples B through H was largely unaffected as evidenced by the Rebound and tan delta values being similar to Control Rubber Sample A. However, replacement of 40 phr of the natural rubber with the E-SBR for rubber Sample H resulted in hysteresis becoming considerably worse as indicated by a lower Rebound value and a significantly higher tan delta value for rubber Sample I.

Accordingly, it is concluded from this Example that the progressive replacement of the natural rubber in the natural rubber/cis 1,4-polybutadiene rubber composition with the (specialized) E-SBR provided improved tear strength and dynamic ozone resistance while maintaining good crack growth resistance. However, at the 40 phr replacement level, significantly poorer results were observed for tack and hysteresis for which it is therefore considered herein that the natural rubber is not to be completely replaced with the (specialized) E-SBR.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a rubber sidewall wherein said sidewall rubber composition is comprised of, based upon parts by weight per 100 parts by weight rubber (phr):
   (A) elastomers consisting essentially of:
      (1) from 10 to 40 phr of natural cis 1,4-polyisoprene rubber having a Tg in a range of from about −62° C. to about −67° C., and
      (2) from 5 to 35 phr of a specialized emulsion polymerization prepared styrene/butadiene rubber having a Tg in a range of from about −60° C. to about −70° C. having a bound styrene content in a range of from about 13 to about 15 percent combined with a Mooney (ML1+4), 100° C., viscosity in a range of from about 70 to about 90, and
      (3) from 50 to 70 phr cis 1,4-polybutadiene rubber; and
   (B) from 30 to about 80 phr of particulate reinforcing filler wherein said particulate reinforcing filler consists essentially of rubber reinforcing carbon black; and
   wherein said specialized E-SBR is the product of aqueous emulsion co-polymerization of styrene and 1,3-butadiene monomers in the presence of a catalyst composite composed of an iron/hydroperoxide redox catalyst system so long as the resulting styrene/butadiene copolymer rubber is said specialized E-SBR.

2. The tire of claim 1 wherein said rubber composition is sulfur cured.

* * * * *